Figure 1:
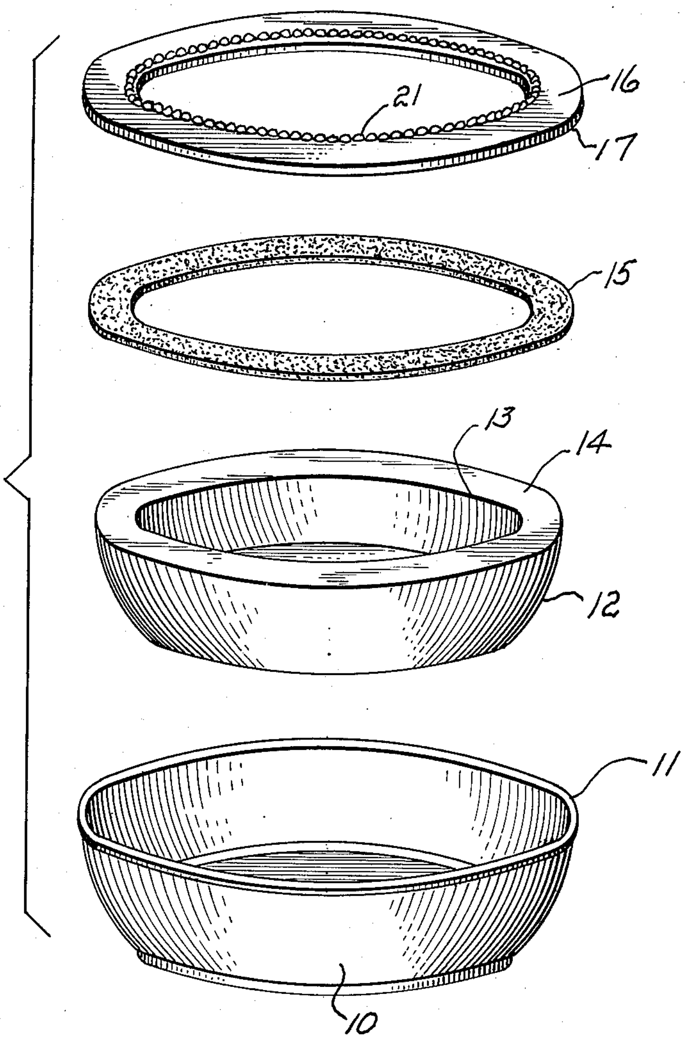

April 24, 1962 B. T. LIPMAN 3,031,096

COMBINATION COASTER AND ASH TRAY

Filed Nov. 7, 1961

INVENTOR.

Bruin T. Lipman

BY

A. H. Golden

ATTORNEY 3,031,096
Patented Apr. 24, 1962

1

3,031,096

COMBINATION COASTER AND ASH TRAY

Bruin T. Lipman, 58 Cambridge St., Meriden, Conn.

Filed Nov. 7, 1961, Ser. No. 150,739
1 Claim. (Cl. 215—12)

This invention relates to a combustion coaster and ash tray. More particularly, the contribution of my invention is a combination coaster and ash tray having the appearance of a silver dish, but the utility of a glass dish.

Even more particularly, my invention contributes a combination coaster and ash tray in which a glass dish serves as the coaster while the silver or decorative metal portion may be utilized to support a cigarette and to give an outer highly decorative appearance.

Even in more detail, my contribution resides in the concept of a flat metal rim member of decorative configuration adapted to seal and assemble to one another a glass dish, a sealing gasket and an outer metal dish.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claim appended hereto. Those skilled in the art will appreciate that the conception on which my disclosure is based may readily be utilized as a basis for the designing of other structures for carrying out the several purposes of my invention. It is important therefore, that the claim be regarded as including such equivalent constructions as do not depart from the spirit and scope of my invention, in order to prevent the appropriation of my invention by those skilled in the art.

Figure 2:
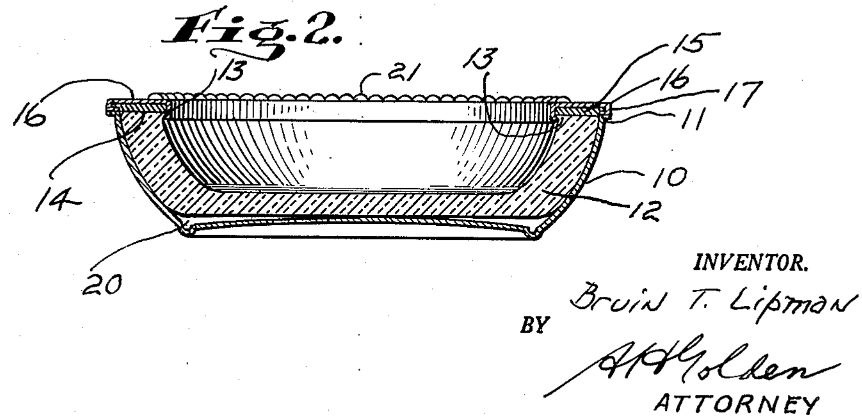

Referring now to the drawings:

FIG. 1 is an exploded view of the four parts of the combination coaster and ash tray to which I have referred; and FIG. 2 is a vertical section of the four parts of FIG. 1 after they have been assembled.

Referring now more particularly to the drawing, the outer metal dish of my invention is designated by reference numeral 10 and is formed with an outer peripheral flange 11. The glass dish of my invention is designated by reference numeral 12, and is formed with an inner peripheral lip 13 extending from a flat upper rim 14. A flat sealing cork gasket forming part of my invention is designated by reference numeral 15. The metal decorative rim assembly member forming part of my invention is designated by reference numeral 16, and is preferably silver or silver plated metal.

2

To form the completed combination ash tray and coaster, the glass dish 12 is set into the metal dish 10 as is very well illustrated in FIG. 2. The flat washer 15 is placed against the flat rim surface 14 of the glass dish 12. The decorative metal assembly rim 16 is then placed with its flat undersurface against the washer 15, after which one edge of the rim 16 is rolled inwardly so as to lock the metal rim against the lip 13 of the glass dish 12 at one side. A downwardly extending portion 17 of the decorative metal rim is similarly rolled over the flange 11 of the silver dish 10.

Obviously, the operation that has just been described effectively seals the glass dish relatively to the decorative rim assembly member so that no moisture can penetrate between the rim 16 or the metal dish 10 on the one side, and the glass dish 12 on the other side. In other words, there can be no movement of moisture into the space 20, shown in FIG. 2. This contributes a most effective coaster and ash tray combination having all the appearance of a silver dish, but all of the utility of a glass dish, with no possibility of deterioration of the assembled product through the movement of moisture. By providing protuberances 21 on rim 16, I facilitate the resting of a cigarette on rim 16 when my invention is used as an ash tray.

I now claim:

A combination ash tray and coaster comprising:

(*a*) a thin metal dish having an outer peripheral flange, (*b*) a glass dish fitted in said metal dish and having an upper flat rim with an inner peripheral lip extending from said rim, (*c*) a flat sealing gasket lying on said flat rim, and (*d*) a decorative thin metal rim member having a flat surface fitted against said sealing gasket with rolled edge portions fitted over both said lip and flange whereby to contribute a glass dish having a metal outer surface and a decorative metal upper rim, with the flat trim of said glass sealed against entry of fluid between the glass and the metal.

References Cited in the file of this patent

UNITED STATES PATENTS

| | | |
|---|---|---|
| 1,237,327 | Greenewald | Aug. 21, 1917 |
| 1,811,286 | Tyndall | June 23, 1931 |